United States Patent
Lee et al.

(10) Patent No.: US 11,511,725 B2
(45) Date of Patent: Nov. 29, 2022

(54) SYSTEM AND METHOD FOR CORRECTING FRICTION COEFFICIENT OF BRAKE PAD FOR VEHICLE

(71) Applicants: HYUNDAI MOTOR COMPANY, Seoul (KR); KIA MOTORS CORPORATION, Seoul (KR)

(72) Inventors: Sang Hyup Lee, Bucheon-si (KR); Dong Hoon Kang, Suwon-si (KR); Hyeong Uk Jang, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 520 days.

(21) Appl. No.: 16/676,324

(22) Filed: Nov. 6, 2019

(65) Prior Publication Data

US 2020/0331447 A1    Oct. 22, 2020

(30) Foreign Application Priority Data

Apr. 17, 2019    (KR) .......................... 10-2019-0044647

(51) Int. Cl.
*B60T 17/22* (2006.01)
*F16D 66/00* (2006.01)
*B60T 8/171* (2006.01)
*B60T 8/172* (2006.01)

(52) U.S. Cl.
CPC ............. *B60T 17/221* (2013.01); *B60T 8/171* (2013.01); *B60T 8/172* (2013.01); *F16D 66/00* (2013.01); *B60T 2220/04* (2013.01); *B60T 2240/00* (2013.01); *B60T 2250/00* (2013.01); *F16D 2066/006* (2013.01)

(58) Field of Classification Search
CPC ........ B60T 8/171; B60T 8/172; B60T 17/221; B60T 2220/04; B60T 2240/00; B60T 2250/00; F16D 66/00; F16D 2066/006
See application file for complete search history.

(56) References Cited

U.S. PATENT DOCUMENTS

| | | | |
|---|---|---|---|
| 2018/0099655 A1* | 4/2018 | Park | B60K 6/26 |
| 2018/0229699 A1* | 8/2018 | Geuβ | B60T 8/58 |
| 2019/0299954 A1* | 10/2019 | Wein | B60W 40/068 |
| 2021/0383040 A1* | 12/2021 | Cho | G06F 30/27 |

* cited by examiner

*Primary Examiner* — Eric S. McCall
(74) *Attorney, Agent, or Firm* — Morgan, Lewis & Bockius LLP

(57) ABSTRACT

The present disclosure provides a system and a method for correcting a friction coefficient of a brake pad for a vehicle, which can estimate a brake factor including a friction coefficient of a brake pad, and ultimately correct the brake factor through the calculation and the update of a brake factor offset based on the estimated brake factor, thereby enhancing the braking linearity of an electric brake system.

11 Claims, 4 Drawing Sheets

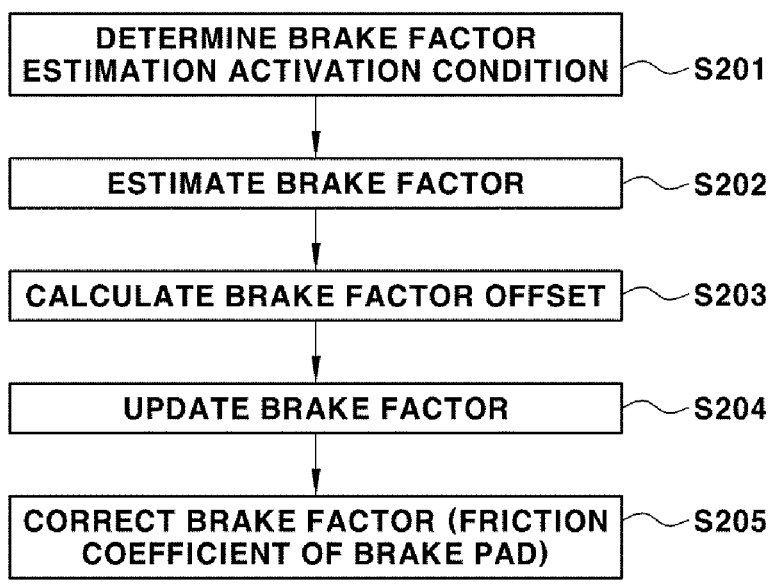
[FIG. 4]

SYSTEM AND METHOD FOR CORRECTING FRICTION COEFFICIENT OF BRAKE PAD FOR VEHICLE

CROSS-REFERENCE TO RELATED APPLICATION

This application claims under 35 U.S.C. § 119(a) the benefit of priority to Korean Patent Application No. 10-2019-0044647 filed on Apr. 17, 2019 in the Korean Intellectual Property Office, the entire contents of which are incorporated herein by reference.

TECHNICAL FIELD

The present disclosure relates to a system and a method for correcting a friction coefficient of a brake pad for a vehicle, and more particularly, to a system and a method for correcting a friction coefficient of a brake pad for a vehicle, which can ultimately correct a friction coefficient offset of the brake pad, thereby improving braking linearity of an electric brake system.

BACKGROUND

Since an eco-friendly vehicle such as a hybrid vehicle, a fuel cell vehicle, or an electric vehicle cannot apply a vacuum booster operated by an engine negative pressure such as an internal combustion engine vehicle, an electric brake system including an Active Hydraulic Booster (AHB), which is a kind of the electric booster, is mounted.

The electric brake system including the active hydraulic booster provides only a brake pedal feeling to a driver, and separately generates a substantial braking hydraulic pressure to transfer it to a wheel cylinder of each wheel so that braking is performed.

Herein, a braking procedure by the conventional electric brake system will be described as follows.

FIG. 1 is a flowchart illustrating a braking procedure by a conventional electric brake system.

First, when the driver depresses a brake pedal, a stroke sensing sensor senses a brake pedal stroke S101.

Next, the driver request braking hydraulic pressure corresponding to the brake pedal stroke sensed by a brake controller 10 is decided S102.

The driver request braking hydraulic pressure is determined from a map table stored in the brake controller 10 as in the left graph of FIG. 1 as a tuning value fixed according to the pedal stroke.

Subsequently, the brake controller 10 calculates a driver request braking torque S103.

The driver request braking torque is calculated by multiplying the driver request braking hydraulic pressure decided in the S102 by a predetermined torque factor.

Next, the brake controller 10 receives the regenerative braking torque information from an upper Hybrid Control Unit (HCU) 20 to calculate the hydraulic braking torque Th for actual hydraulic braking S104.

Since the regenerative braking torque due to the motor is reflected to the braking force at the time of braking the eco-friendly vehicle (hybrid vehicle, electric vehicle, etc.), the hydraulic braking torque Th is decided by subtracting the regenerative braking torque Tregen from a total braking torque Ttotal that is the driver request braking torque calculated in the S103.

Then, the brake controller 10 calculates a target braking hydraulic pressure $P_{target}$ for actual hydraulic braking S105.

The target braking hydraulic pressure $P_{target}$ is determined by a value obtained by dividing the hydraulic braking torque Th calculated in the S104 by a predetermined torque factor.

Finally, the hydraulic pressure control is executed so that the target braking hydraulic pressure $P_{target}$ decided as described above is applied to the wheel cylinder of each wheel S106.

Therefore, the braking of the eco-friendly vehicle is composed of the sum of the hydraulic braking force and the regenerative braking force by the execution of the hydraulic pressure control.

Meanwhile, the torque factor is called a brake factor, is a constant value calculated by multiplying a friction coefficient of the brake pad, a piston area of a caliper restricting the brake pad, and an effective radius, which is a distance from a wheel center to the point where the brake pad contacts a disk, as the following (Equation 1), and can be defined as a braking torque generated per 1 bar of the hydraulic pressure.

$$\text{Torque factor} = \text{Friction coefficient} \times \text{Caliper piston area} \times \text{Effective radius} \quad \text{(Equation 1)}$$

When the friction coefficient is changed as the torque factor, that is, the brake factor is used as a fixed constant value, the target braking hydraulic pressure obtained by dividing the hydraulic braking torque Th by the torque factor is also changed, and as a result, the braking force and the braking feeling of the vehicle can be changed.

FIG. 2 is a graph for explaining the friction coefficient variation of the brake pads and the braking linearity problem thereby.

Referring to the left graph of FIG. 2, the friction coefficient of the brake pad has deviation according to the brake temperature and seasonal temperature.

For example, the friction coefficient of the brake pad is lower when the brake temperature is lower, while it is higher when the brake temperature is higher, and in addition, has deviation according to the hot and humid summer and the cold and dry winter.

Therefore, as the friction coefficient of the brake pad is changed, the brake factor is changed, and the braking feeling can also be changed at braking.

That is, since the brake factor is a constant value calculated by multiplying the friction coefficient of the brake pad, the piston area of the caliper, and the effective radius, which is the distance from the wheel center to the point where the brake pad contacts the disk, the brake factor is changed when the friction coefficient of the brake pad changes, thereby affecting the braking feeling variation.

Referring to the right graph of FIG. 2, there is a problem in that when the friction coefficient of the brake pad is changed, the brake factor for calculating the target braking hydraulic pressure $P_{target}$ is changed, such that scattering occurs in the braking feeling, the braking linearity becomes uneven according to the deceleration, and as a result, the driver feels a sense of heterogeneity at braking.

The above information disclosed in this Background section is only for enhancement of understanding of the background of the disclosure and therefore it can contain information that does not form the prior art that is already known in this country to a person of ordinary skill in the art.

SUMMARY

The present disclosure is intended to solve the above-described conventional problem, and an objective of the present disclosure is to provide a system and a method for correcting a friction coefficient of a brake pad for a vehicle, which can estimate a brake factor including a friction coefficient of a brake pad, and ultimately correct the brake factor through the calculation and the update of a brake factor offset based on the estimated brake factor, thereby enhancing the braking linearity of an electric brake system.

An exemplary embodiment of the present disclosure includes a brake controller; a G sensor for inputting a deceleration signal to a brake controller; a wheel speed sensor for inputting a wheel speed signal to the brake controller; a wheel pressure sensor for inputting a wheel pressure signal to the brake controller at braking; and an upper level controller for inputting regenerative braking torque and coasting traveling braking torque signals to the brake controller.

The brake controller is configured to: determine an activation condition for estimating a brake factor; estimate the brake factor when the brake factor estimation activation condition is satisfied; calculate a brake factor offset by operating a difference between the estimated brake factor and a previous brake factor; and update the calculated brake factor offset.

As another exemplary embodiment of the present disclosure, a method for correcting a friction coefficient of a brake pad for a vehicle includes determining, by a brake controller, an activation condition for estimating a brake factor; estimating, by the brake controller, the brake factor when the brake factor estimation activation condition is satisfied; calculating, by the brake controller, a brake factor offset by operating a difference between the estimated brake factor and a previous brake factor; updating, by the brake controller, the calculated brake factor offset; and correcting, by the brake controller, the friction coefficient of the brake pad based on the updated brake factor offset.

The present disclosure provides the following effects through the above-described configuration.

According to the present disclosure, it is possible to correct the brake factor offset, that is, the friction coefficient offset of the brake pad, thereby constantly keeping the braking linearity together with preventing the scattering of braking feeling and the sense of heterogeneity at braking, unlike the conventional problem in that the scattering occurs in the braking feeling as the brake factor is changed, and the braking linearity according to the deceleration does not become constant, thereby occurring the sense of heterogeneity at braking.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 4 is a flowchart illustrating a method for correcting the friction coefficient of the brake pad according to an exemplary embodiment of the present disclosure.

Figure 1:
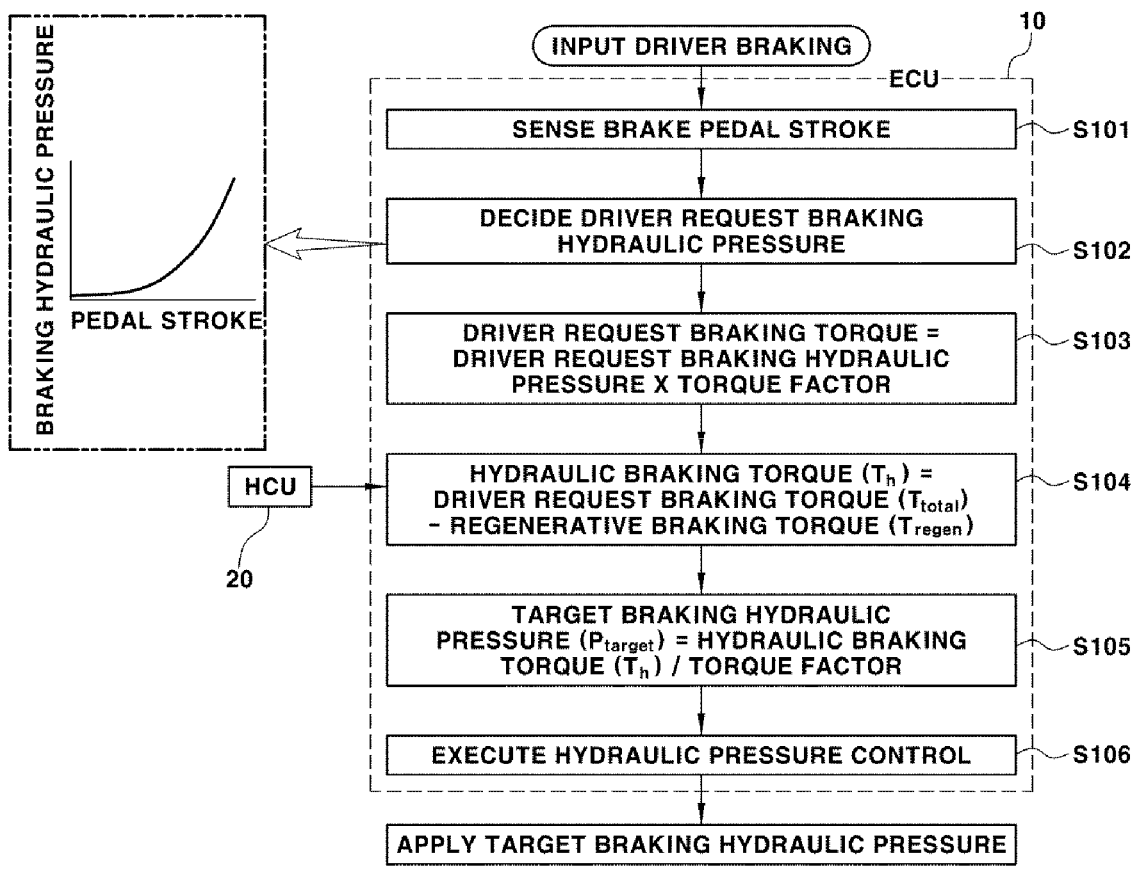
FIG. 1 is a flowchart illustrating a braking procedure by a conventional electric brake system.
Figure 2:
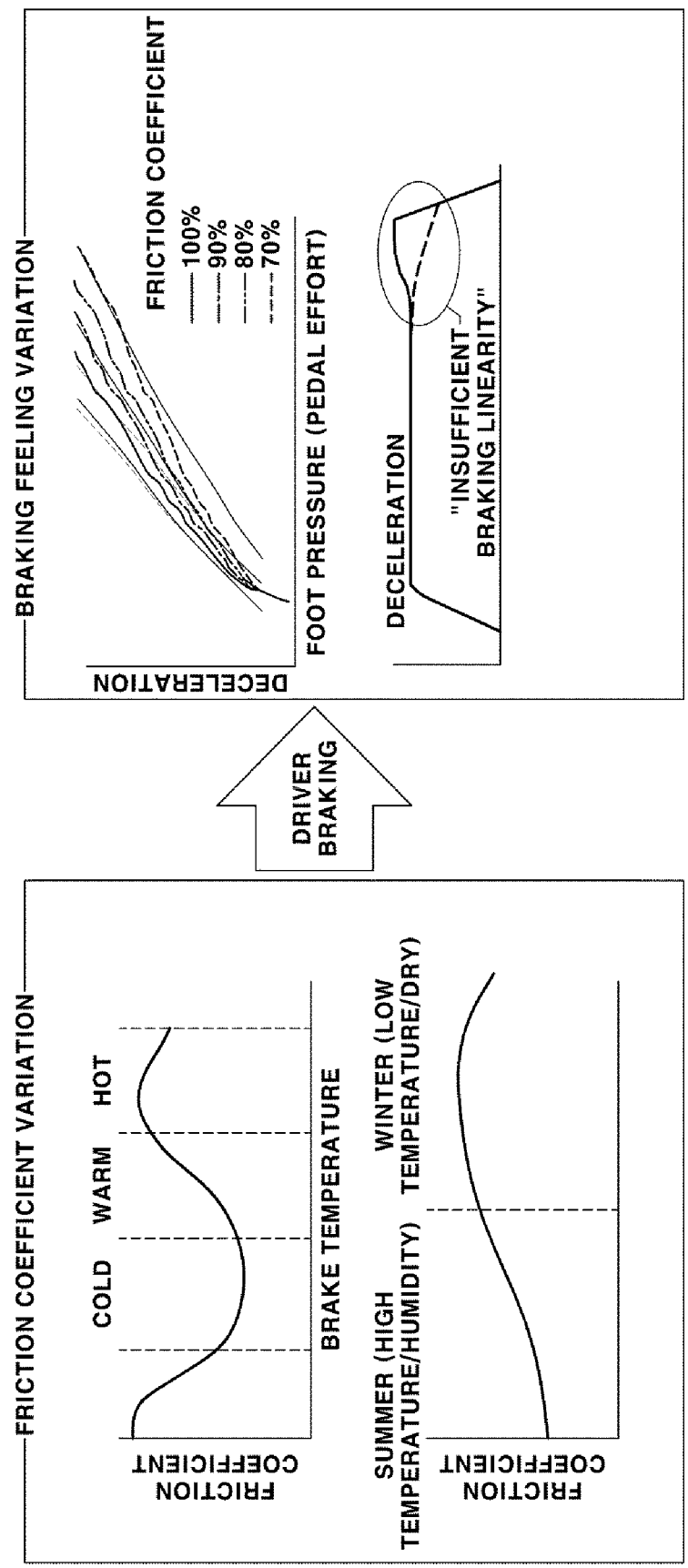
FIG. 2 is a graph for explaining the friction coefficient variation of a brake pad and the braking linearity problem thereby.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings.

As described above, a brake factor is a constant value calculated by multiplying a friction coefficient of a brake pad, a piston area of a caliper restricting the brake pad, and an effective radius, which is the distance from the wheel center to the point where the brake pad contacts a disk, and is defined as a braking torque generated per 1 bar of hydraulic pressure.

The piston area of the caliper and the effective radius are unchanged values, but it can be seen that since the friction coefficient of the brake pad can be changed according to the brake temperature and the seasonal temperature, the estimation of the brake factor, which will be described below, can be the same as the estimation of the friction coefficient of the brake pad.

Figure 3:
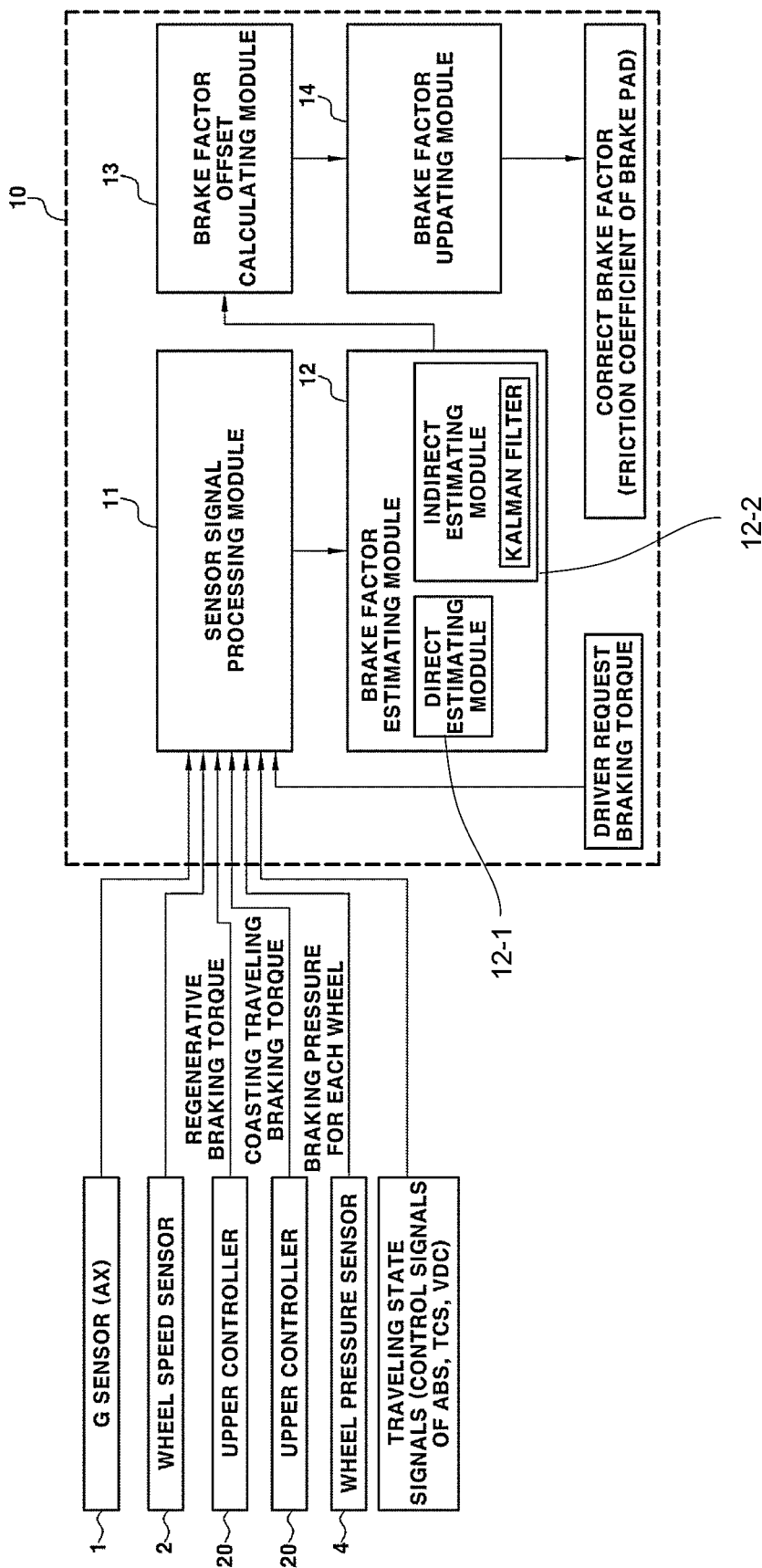
FIG. 3 is a block diagram illustrating a system for correcting a friction coefficient of the brake pad according to an exemplary embodiment of the present disclosure.

FIG. 3 is a block diagram illustrating a system for estimating a friction coefficient of a brake pad according to the present disclosure, and FIG. 4 is a flowchart illustrating a method for estimating a friction coefficient of a brake pad according to the present disclosure.

As illustrated in FIG. 3, a brake controller 10 may include a processor (e.g., computer, microprocessor, CPU, ASIC, circuitry, logic circuits, etc.). The processor of the brake controller 10 may have an associated non-transitory memory storing software instructions which, when executed by the processor, provides functionalities of a sensor signal processing module 11, a brake factor estimating unit 12, a brake factor offset calculating module 13, and a brake factor offset updating module 14.

In addition, the sensor signal processing module 11 of the brake controller 10 receives a deceleration sensing signal of a G (gravity) sensor 1 included in an Electronic Stability Control (ESC) system, a speed signal of a wheel speed sensor 2, a wheel braking pressure signal at braking of a wheel pressure sensor 4, and traveling state signals such as control signals of an Anti-lock Brake System (ABS), a Traction Control System (TCS), and a Vehicle Dynamic Control (VDC) related to a vehicle braking and posture control.

In addition, the sensor signal processing module 11 of the brake controller 10 receives regenerative braking torque and coasting traveling braking torque signals from an upper level controller 20 as the driver request braking torque calculated by the brake controller 10. The upper level controller 20 may include at least one memory and at least one processor programmed to perform such tasks.

First, the sensor signal processing module 11 determines an activation condition for estimating a brake factor S201.

For this purpose, the sensor signal processing module 11 performs signal processing on an input signal, and determines a brake factor estimation activation condition based on the above.

Preferably, the sensor signal processing module 11 performs synchronization on the phase for each signal input to the sensor signal processing module 11 in order to enhance the brake factor estimation reliability.

For example, the sensor signal processing module 11 performs the synchronization by filtering a deceleration sensing signal Ax of a G sensor 1, a speed signal from a wheel speed sensor 2, a wheel pressure signal at braking from a wheel pressure sensor 4, regenerative braking torque and coasting traveling braking torque from the upper level controller 20, and the driver request braking torque calculated by the brake controller 10.

The sensor signal processing module 11 determines that the activation condition for estimating the brake factor is satisfied when the driver request braking torque, the wheel speed, the wheel pressure, the regenerative braking torque, and the regenerative braking torque slope are equal to or greater than a reference value, respectively.

More specifically, when the sensor signal processing module 11 determines the brake factor estimation activation condition, it is determined whether the activation conditions ① to ⑤ below are satisfied.

① The driver request braking torque is equal to or greater than a predetermined reference value for activating the brake factor estimation (the driver request braking torque>=the reference value), ② The wheel speed is equal to or greater than a predetermined reference value for activating the brake factor estimation (the wheel speed>=the reference value), ③ The wheel pressure is equal to or greater than a predetermined reference value for activating the brake factor estimation (the wheel pressure>=the reference value (e.g., 1 bar)), ④ The regenerative braking torque is equal to or greater than a predetermined reference value for activating the brake factor estimation (the regenerative braking torque>=the reference value), ⑤ The regenerative braking torque slope is equal to or greater than a predetermined reference value for activating the brake factor estimation (the regenerative braking torque slope>=the reference value).

When the sensor signal processing module 11 determines the brake factor estimation activation condition, the reason for determining whether the activation conditions ① to ⑤ are satisfied is because the brake factor is changed due to the friction coefficient variation when the activation conditions ① to ⑤ are satisfied.

Next, when the activation conditions ① to ⑤ for activating the brake factor estimation are satisfied, the brake factor estimating module 12 estimates the brake factor S202.

That is, when the sensor signal processing module 11 determines that the activation conditions ① to ⑤ are satisfied to transmit a satisfying signal to the brake factor estimating module 12, the brake factor estimating module 12 estimates the brake factor by using the wheel dynamics.

The brake factor estimating module 12 is composed of a direct estimating module 12-1 for estimating the brake factor in a manner of inversely calculating the braking force and the wheel dynamics, and an indirect estimating module 12-2 for estimating the brake factor by using a Kalman filter and the wheel dynamics.

The direct estimating module 12-1 estimates the brake factor by inversely calculating a wheel dynamics factor, and estimates the brake factor based on input signals such as the wheel deceleration included in an inertia torque, a braking force torque, a regenerative braking torque, and a wheel pressure.

That is, the direct estimating module 12-1 estimates the brake factor based on the wheel deceleration signal inputted from the G sensor 1, the braking force torque calculated by the brake controller 10, the regenerative braking torque inputted from the upper level controller 20, and the wheel pressure signal inputted from the wheel pressure sensor 4.

The brake factor estimated by inversely calculating the wheel dynamics element in the direct estimating module 12-1 is expressed by the following Equation 1.

$$C_p = \frac{-J \cdot \frac{dw}{dt} + r \times F_b - T_{reg}}{P_{wheel}} \qquad \text{Equation 1}$$

In the Equation 1, $C_p$: an estimated brake factor, $$-J \cdot \frac{dw}{dt}:$$

the inertia torque, r: the effective radius, which is the distance from the wheel center to the point where the brake pad contacts the disk, $F_b$: the braking force generated by the brake pad contacting the disk, $r \times F_b$: the braking force torque, $T_{reg}$: the regenerative braking torque, and the wheel $P_{wheel}$: the wheel pressure.

When the direct estimating module 12-1 estimates the brake factor by using the Equation 1, the wheel deceleration included in the inertia torque, the regenerative braking torque, the wheel pressure, etc. are fixed values, but the braking force is an estimation signal calculated by the brake controller, such that it is possible to secure the brake factor estimation accuracy when the braking force estimation performance is good, but it is possible to reduce the brake factor estimation accuracy when the braking force estimation is not perfect.

As described above, considering the fact that the braking force estimation cannot be perfect, the indirect estimating module 12-2 simultaneously estimates the brake factor and the braking force by using a mathematical model using a Kalman filter.

For reference, the Kalman filter simultaneously estimates the brake factor and the braking force by using a state equation having a factor change rate, the sensing signal Ax offset of the G sensor, etc. as state variables.

Therefore, although it is preferable to use the brake factor calculated through the Equation 1 in the direct estimating module 12-1 of the brake factor estimating module 12 in calculating the brake factor offset that is a next step, it is more preferable to use the brake factor obtained by weighted sum of the brake factor estimated by using the mathematical model using the Kalman filter in the indirect estimating module 12-2 and the brake factor estimated by the direct estimating module 12-1 in calculating the brake factor offset that is a next step.

Next, the brake factor offset calculating module 13 calculates the brake factor offset by operating a difference between the brake factor estimated by the brake factor estimating module 12 in the S202, and the previous brake factor S203.

As an example of the calculating the brake factor offset, the brake factor offset is calculated based on the difference between the brake factor estimated by the direct estimating module 12-1 of the brake factor estimating module 12 and the previous brake factor, and when the calculated brake factor offset falls within a certain range for a certain time, it is determined that the convergence of the brake factor offset has been completed, and the brake factor offset to be calculated is decided only when the convergence-completed brake factor offset is equal to or greater than a reference value.

As another example of the calculating the brake factor offset, a moving average value is calculated when the brake factor dispersion obtained by using the Kalman filter has a local minimum value at a predetermined value or less, and the brake factor offset is calculated as a difference between the moving average value and the previous brake factor, and it is determined that the convergence of the brake factor offset has been completed when the calculated brake factor offset falls within a certain range for a certain time, and the brake factor offset to be calculated is decided only when the convergence-completed brake factor offset is equal to or greater than the reference value.

The reason for deciding the brake factor offset to be calculated only when the convergence-completed brake factor offset is equal to or greater than the reference value as described above is for preventing the brake factor offset from being updated frequently or sensitively.

Meanwhile, the brake factor offset updating module 14 calculates and determines the reliability of the brake factor offset calculated by the brake factor offset calculating module 13 to update the brake factor offset S204.

For example, the brake factor offset updating module 14 can update the brake factor offset at the time of setting an update request variable (e.g., at the time of receiving the signal for determining the convergence of the brake factor offset in the S203), and immediately before stopping the vehicle (e.g., a vehicle speed=3 kph).

As an example of the method for updating the brake factor offset, a method for updating the brake factor offset in real time can be adopted considering the fact that the friction coefficient of the brake pad is changed according to the brake temperature.

As another example of the method for updating the brake factor offset, a method for updating the brake factor offset by a predetermined period (summer and winter seasons) can be adopted considering the fact that the friction coefficient of the brake pad has deviation according to the seasonal temperature.

For example, the brake factor offset updating module 14 performs the update of deciding the final brake factor offset by using the brake factor offset calculated by the brake factor offset calculating module 13 as follows.

Final brake factor offset=the previous final brake factor offset+$A$*(the calculated brake factor offset−the previous final brake factor offset) (Equation):

In the Equation, A: a filter constant.

As described above, it can be seen that the brake factor offset finally decided by the brake factor offset updating module 14 is the same as the friction coefficient offset of the brake pad.

That is, since the brake factor is calculated by multiplying the friction coefficient of the brake pad, the piston area of the caliper restricting the brake pad, and the effective radius, which is the distance from the wheel center to the point where the brake pad contacts the disk, the piston area of the caliper and the effective radius are unchanged values, but the friction coefficient of the brake pad can be changed according to the brake temperature and the seasonal temperature, such that it can be seen that the brake factor offset finally decided by the brake factor offset updating module 14 is the same as the friction coefficient offset of the brake pad.

Therefore, the brake controller 10 corrects the brake factor, that is, the friction coefficient of the brake pad based on the brake factor offset finally decided by the brake factor offset updating module 14 S205.

For example, it is possible to add or subtract the brake factor offset finally decided by the brake factor offset updating module 14 to and from the previous brake factor to correct the brake factor, that is, the friction coefficient of the brake pad, thereby constantly keeping the braking linearity.

That is, it is possible for the brake controller 10 to correct the brake factor, that is, the friction coefficient of the brake pad based on the brake factor offset finally decided by the brake factor offset updating module 14, thereby solving the conventional problem in that the scattering occurs in the braking feeling as the brake factor is changed, and the braking linearity due to the deceleration does not become constant, thereby occurring the sense of heterogeneity at braking.

As described above, although the embodiments of the present disclosure have been described in detail with reference to the drawings, the present disclosure is not limited to the above-described embodiments, and various modifications can be made without departing from the technical scope of the present disclosure.

What is claimed is:

1. A system for correcting a friction coefficient of a brake pad for a vehicle, comprising:
   a brake controller;
   a G sensor for inputting a deceleration signal to the brake controller;
   a wheel speed sensor for inputting a wheel speed signal to the brake controller;
   a wheel pressure sensor for inputting a wheel pressure signal to the brake controller at braking; and
   an upper level controller for inputting regenerative braking torque and coasting traveling braking torque signals to the brake controller,
   wherein the brake controller is configured to:
      determine an activation condition for estimating a brake factor;
      estimate the brake factor, when the brake factor estimation activation condition is satisfied;
      calculate a brake factor offset by operating a difference in value between the estimated brake factor and a previous brake factor;
      update the previous brake factor with the calculated brake factor offset; and correct the friction coefficient of the brake pad based on the updated brake factor offset.

2. The system of claim 1,
wherein the brake controller determines that the activation condition for estimating the brake factor is satisfied when a driver request braking torque, a wheel speed, a wheel pressure, a regenerative braking torque, and a regenerative braking torque slope are equal to or greater than a reference value, respectively.

3. The system of claim 1,
wherein the brake controller estimates the brake factor in a manner of inversely calculating braking force and wheel dynamics, or estimates the brake factor by using a Kalman filter and the wheel dynamics,
wherein the brake controller estimates the brake factor by $$C_p = \frac{-J \cdot \frac{dw}{dt} + r \times F_b - T_{reg}}{P_{wheel}},$$

and
wherein Cp: the estimated brake factor, $$-J \cdot \frac{dw}{dt}:$$

an inertia torque, r: an effective radius, which is the distance from the wheel center to the point where the brake pad contacts a disk, Fb: the braking force generated by the brake pad contacting the disk, r×Fb: the braking force torque, Treg: the regenerative braking torque, and Pwheel: the wheel pressure.

4. The system of claim 1,
wherein the brake controller calculates the brake factor offset by a difference between the estimated brake factor and the previous brake factor,
wherein the brake controller determines that convergence of the brake factor offset has been completed when the calculated brake factor offset falls within a certain range for a certain time, and
wherein, when the brake factor offset of which the convergence has been completed is equal to or greater than a reference value, the brake controller decides the brake factor offset, which is equal to or greater than the reference value, to be the brake factor offset to be calculated.

5. The system of claim 1,
wherein the brake controller updates the brake factor offset in real time considering that the friction coefficient of the brake pad is changed according to a brake temperature, or updates the brake factor offset for each predetermined period considering that the friction coefficient of the brake pad has a deviation according to a seasonal temperature.

6. A method for correcting a friction coefficient of a brake pad for a vehicle, comprising steps of:
determining, by a brake controller, an activation condition for estimating a brake factor;
estimating, by the brake controller, the brake factor when the brake factor estimation activation condition is satisfied;
calculating, by the brake controller, a brake factor offset by operating a difference in value between the estimated brake factor and a previous brake factor;
updating, by the brake controller, the previous brake factor with the calculated brake factor offset; and
correcting, by the brake controller, the friction coefficient of the brake pad based on the updated brake factor offset.

7. The method of claim 6,
wherein, in the step of determining an activation condition, the brake controller determines that the activation condition for estimating the brake factor is satisfied when a driver request braking torque, a wheel speed, a wheel pressure, a regenerative braking torque, and a regenerative braking torque slope are equal to or greater than a reference value, respectively.

8. The method of claim 6,
wherein, in the step of estimating a brake factor, the brake controller estimates the brake factor in a manner of inversely calculating braking force and wheel dynamics, or estimates the brake factor by using a Kalman filter and the wheel dynamics,
wherein the brake controller estimates the brake factor by $$C_p = \frac{-J \cdot \frac{dw}{dt} + r \times F_b - T_{reg}}{P_{wheel}},$$

and
wherein Cp: the estimated brake factor, $$-J \cdot \frac{dw}{dt}:$$

an inertia torque, r: an effective radius, which is the distance from the wheel center to the point where the brake pad contacts a disk, Fb: the braking force generated by the brake pad contacting the disk, r×Fb: the braking force torque, Treg: the regenerative braking torque, and Pwheel: the wheel pressure.

9. The method of claim 6,
wherein the brake controller calculates the brake factor offset by a difference between the estimated brake factor and the previous brake factor,
wherein the brake controller determines that convergence of the brake factor offset has been completed when the calculated brake factor offset falls within a certain range for a certain time, and
wherein, when the brake factor offset of which the convergence has been completed is equal to or greater than a reference value, the brake controller decides the brake factor offset, which is equal to or greater than the reference value, to be the brake factor offset to be calculated.

10. The method of claim 6,
wherein, in the step of updating the calculated brake factor offset, the brake controller updates the brake factor offset in real time considering that the friction coefficient of the brake pad is changed according to a brake temperature, or updates the brake factor offset for each predetermined period considering that the friction coefficient of the brake pad has a deviation according to a seasonal temperature.

11. A system for correcting a friction coefficient of a brake pad for a vehicle, comprising:
a brake controller;

a G sensor for inputting a deceleration signal to the brake controller;
a wheel speed sensor for inputting a wheel speed signal to the brake controller;
a wheel pressure sensor for inputting a wheel pressure signal to the brake controller at braking; and
an upper level controller for inputting regenerative braking torque and coasting traveling braking torque signals to the brake controller,
wherein the brake controller is configured to:
  determine an activation condition for estimating a brake factor;
  estimate the brake factor, when the brake factor estimation activation condition is satisfied;
  calculate a brake factor offset by operating a difference in value between the estimated brake factor and a previous brake factor, wherein the brake factor is a value calculated by multiplying a friction coefficient of a brake pad, a piston area of a caliper restricting the brake pad, and an effective radius, which is the distance from the wheel center to the point where the brake pad contacts a disk, and is defined as a braking torque generated per 1 bar of hydraulic pressure;
  update the previous brake factor with the calculated brake factor offset; and
  correct, the friction coefficient of the brake pad based on the updated brake factor offset,
wherein the brake controller updates the brake factor offset in real time considering that the friction coefficient of the brake pad is changed according to a brake temperature, or updates the brake factor offset for each predetermined period considering that the friction coefficient of the brake pad has a deviation according to a seasonal temperature.

* * * * *